United States Patent
Rico Alvarino et al.

(10) Patent No.: US 11,089,593 B2
(45) Date of Patent: Aug. 10, 2021

(54) RASTER DESIGN FOR NARROWBAND OPERATION FOR MACHINE TYPE COMMUNICATIONS

(71) Applicant: QUALCOMM Incorporated, San Diego, CA (US)

(72) Inventors: Alberto Rico Alvarino, San Diego, CA (US); Peter Gaal, San Diego, CA (US); Xiaofeng Wang, San Diego, CA (US); Wanshi Chen, San Diego, CA (US); Seyed Ali Akbar Fakoorian, San Diego, CA (US); Hao Xu, Beijing (CN); Renqiu Wang, San Diego, CA (US); Jing Lei, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/356,813

(22) Filed: Mar. 18, 2019

(65) Prior Publication Data
US 2019/0215835 A1    Jul. 11, 2019

Related U.S. Application Data

(62) Division of application No. 15/387,970, filed on Dec. 22, 2016, now Pat. No. 10,278,180.
(Continued)

(51) Int. Cl.
*H04W 72/04* (2009.01)
*H04L 5/00* (2006.01)
(Continued)

(52) U.S. Cl.
CPC ....... *H04W 72/0453* (2013.01); *H04L 5/0048* (2013.01); *H04L 5/0053* (2013.01);
(Continued)

(58) Field of Classification Search
CPC ... H04L 5/0048; H04L 5/0053; H04L 5/0092; H04W 4/70; H04W 72/0453; H04W 72/087; H04W 88/02; H04W 88/08
See application file for complete search history.

(56) References Cited

U.S. PATENT DOCUMENTS 10,278,180 B2    4/2019  Rico et al.
2010/0029283 A1   2/2010  Iwamura
(Continued)

FOREIGN PATENT DOCUMENTS

EP    3327962 A1    5/2018
JP    2015503264 A  1/2015
(Continued)

OTHER PUBLICATIONS https://portal.3gpp.org/ngppapp/CreateTdoc.aspx?mode=view&contributionId=678835 (Year: 2016), 3 Pages.
(Continued)

*Primary Examiner* — Kashif Siddiqui
(74) *Attorney, Agent, or Firm* — Patterson & Sheridan, L.L.P.

(57) ABSTRACT

Aspects of the present disclosure provide techniques for design of channel raster for narrowband operation. One example method, performed by a base station, generally includes determining, based on one or more conditions, an exact frequency location of one channel of one or more channels to perform narrowband communications with a user equipment. The method also includes transmitting an indication of the one or more conditions to the user equipment. The method further includes communicating with the UE, based at least in part on the exact frequency location of the one channel.

14 Claims, 12 Drawing Sheets

Related U.S. Application Data

(60) Provisional application No. 62/308,000, filed on Mar. 14, 2016, provisional application No. 62/295,132, filed on Feb. 14, 2016, provisional application No. 62/279,652, filed on Jan. 15, 2016.

(51) Int. Cl.
*H04W 4/70* (2018.01)
*H04W 72/08* (2009.01)
*H04W 88/02* (2009.01)
*H04W 88/08* (2009.01)

(52) U.S. Cl.
CPC ............ *H04L 5/0092* (2013.01); *H04W 4/70* (2018.02); *H04W 72/087* (2013.01); *H04W 88/02* (2013.01); *H04W 88/08* (2013.01)

(56) References Cited

U.S. PATENT DOCUMENTS

| | | | |
|---|---|---|---|
| 2012/0327895 A1 | 12/2012 | Wallen et al. | |
| 2013/0301549 A1 | 11/2013 | Chen et al. | |
| 2014/0086085 A1 | 3/2014 | Zheng et al. | |
| 2015/0256299 A1* | 9/2015 | Gong | H04W 72/0466 370/329 |
| 2016/0249224 A1 | 8/2016 | Prasad et al. | |
| 2017/0142737 A1 | 5/2017 | Zheng et al. | |
| 2017/0265156 A1 | 9/2017 | Xue et al. | |
| 2018/0198574 A1* | 7/2018 | Papasakellariou | H04W 48/12 |
| 2018/0270008 A1* | 9/2018 | Yi | H04W 74/0833 |
| 2018/0317198 A1* | 11/2018 | Lee | H04L 5/0007 |

FOREIGN PATENT DOCUMENTS

| | | | |
|---|---|---|---|
| JP | 2018516002 A | 6/2018 | |
| WO | 2014049326 A1 | 4/2014 | |
| WO | 2017075981 A1 | 5/2017 | |

OTHER PUBLICATIONS

International Search Report and Written Opinion—PCT/US2016/068467—ISA/EPO—dated Apr. 10, 2017.
QUALCOMM Incorporated: "NB-PBCH Design", 3GPP Draft, R1-160102 NB-PBCH Design, 3rd Generation Partnership Project (3GPP), Mobile Competence Centre, 650, Route Des Lucioles, F-06921 Sophia-Antipolis Cedex, France, vol. RAN WG1, No. Budapest, HU, Jan, 18, 2016-Jan. 28, 2016, Jan. 12, 2016 (Jan. 12, 2016), XP051064715, Retrieved from the Internet:URL: http://www.3gpp.org/ftp/tsg_ran/WG1_RL1/TSGR1_AH/LTE_NB-IoT_1601/Docs/.
Sony: "Coexistence of eMTC and NB-IoT", 3GPP Draft, R1-156693 Coexistence MTC NBIOT, 3rd Generation Partnership Project (3GPP), Mobile Competence Centre, 650, Route Des Lucioles, F-06921 Sophia-Antipolis Cedex, France, vol. RAN WG1, No. Anaheim, USA, Nov. 15, 2015-Nov. 22, 2015, Nov. 15, 2015 (Nov. 15, 2015), XP051003078, Retrieved from the Internet: URL: http://www.3gpp.org/ftp/Meetings_3GPP_SYNC/RAN1/Docs/. www.3gpp.org-/ftp/tsg_ran/WG1_RL1/TSGR1_AH/LTE_NB-IoT_1601/Docs/ (Year: 2016), 4 Pages.
ZTE: "Considerations on Channel Raster for NB-IoT", 3GPP Draft; R1-160051 Channel Raster, 3rd Generation Partnership Project (3GPP), Mobile Competence Centre ; 650, Route Des Lucioles ; F-06921 Sophia-Antipolis Cedex; France, vol. RAN WG1, No. Budapest, HU, Jan. 18, 2016-Jan. 20, 2016, Jan. 11, 2016 (Jan. 11, 2016), XP051064635, pp. 1-7, Retrieved from the Internet: URL: http://www.3gpp.org/ftp/tsg_ran/WG1_RL1/TSGR1_AH/LTE NB-IoT_1601/Docs/.
ZTE: NB-PBCH design for NB-IoT, 3GPP Draft, R1-160042 NB-PBCH, 3rd Generation Partnership Project (3GPP), Mobile Competence Centre, 650, Route Des Lucioles, F-06921 Sophia-Antipolis Cedex, France, vol. RAN WG1, No. Budapest, HU, Jan. 18, 2016-Jan. 20, 2016, Jan. 11, 2016 (Jan. 11, 2016), XP051064627, Retrieved from the Internet: URL: http://www.3gpp.org/ftp/tsg_ran/WG1_RL1/TSGR1_AH/LTE_NB-IoT_1601/Docs/.
Zte et al: "WF on Bitwidth of MIB Content for NB-IoT", 3GPP Draft; R1-161231, Feb. 24, 2016, XP051079166, 12 pages, Retrieved from the Internet: URL: http://www.3gpp.org/ftp/tsg_ran/WG1_RL1/TSGR1_84/Docs/ [retrieved on Feb. 24, 2016].
Nokia Networks et al., "MIB for MTC", R2-150130, 3GPP TSG-RAN WG2 Meeting #89, Athens, Greece, Feb. 9-13, 2015, 2 pages, Retrieved from the Internet https://www.3gpp.org/ftp/tsg_ran/WG2_RL2/TSGR2_89/Docs/.
Nokia Networks: "Using MIB Spare Bits for MTC", 3GPP TSG-RAN WG1 Meeting #80bis, R1-151315, Belgrade, Serbia, Apr. 20-24, 2015, 3 pages, XP050934194, URL:http://www.3gpp.org/ftp/tsg_ran/WG1_RL1/TSGR1_80b/Docs/R1-151315.zip.
Taiwan Search Report—TW105142899—TIPO—dated Nov. 27, 2019.
European Search Report—EP20192476—Search Authority—The Hague—dated Nov. 13, 2020.
LENOVO: "On NB-IoT Anchor Carrier," 3GPP TSG RAN WG1 adhoc_LTE_NB-IoT_1601, 3GPP Draft; R1-160121, 3rd Generation Partnership Project (3GPP), Mobile Competence Centre; 650, Route Des Lucioles; F-06921 Sophia-Antipolis Cedex; France, vol. Ran WG1, No. Budapest, HU; Jan. 18, 2016-Jan. 20, 2016, Jan. 12, 2016, XP051064733, 4 pages, Retrieved from the Internet: URL: http://www.3gpp.org/ftp/tsg_ran/WG1_RL1/TSGR1_AH/LTE_NB-IoT_1601/Docs/R1-160121.zip, [retrieved on Jan. 12, 2016].
LENOVO: "Reference Signals for Narrowband IoT Downlink Channels", 3GPP TSG RAN WG1 NB-IoT Ad-Hoc Meeting, R1-160120, Budapest, Hungary, Jan. 18-20, 2016, URL: https://www.3gpp.org/ftp/TSG_RAN/WG1_RL1/TSGR1_AH/LTE_NB-IoT_1601/Docs/R1-160120.zip, 3 Pages.
Taiwan Search REPORT—TW109124660—TIPO—dated Mar. 3, 2021.

\* cited by examiner

| Value | TBS | $R_{SIB1bis}$ |
|---|---|---|
| 0 | No SIB1bis transmission | |
| 1 | TBS1 | 4 |
| 2 | TBS1 | 8 |
| 3 | TBS1 | 16 |
| 4 | TBS2 | 4 |
| 5 | TBS2 | 8 |
| 6 | TBS2 | 16 |
| 7 | TBS3 | 4 |
| 8 | TBS3 | 8 |
| 9 | TBS3 | 16 |
| 10 | TBS4 | 4 |
| 11 | TBS4 | 8 |
| 12 | TBS4 | 16 |
| 13 | TBS5 | 4 |
| 14 | TBS5 | 8 |
| 15 | TBS5 | 16 |
| 16 | TBS6 | 4 |
| 17 | TBS6 | 8 |
| 18 | TBS6 | 16 |
| 19-31 | Reserved | |

*FIG. 11*

| Value | TBS | $R_{SIB1bis}$ | Remove NB-IoT NB |
|---|---|---|---|
| 0 | No SIB1bis transmission | | N/A |
| 1 | TBS1 | 4 | No |
| 2 | TBS1 | 8 | No |
| 3 | TBS1 | 16 | No |
| 4 | TBS2 | 4 | No |
| 5 | TBS2 | 8 | No |
| 6 | TBS2 | 16 | No |
| 7 | TBS3 | 4 | No |
| 8 | TBS3 | 8 | No |
| 9 | TBS3 | 16 | No |
| 10 | TBS4 | 4 | No |
| 11 | TBS4 | 8 | No |
| 12 | TBS4 | 16 | No |
| 13 | TBS5 | 4 | No |
| 14 | TBS5 | 8 | No |
| 15 | TBS5 | 16 | No |
| 16 | TBS6 | 4 | No |
| 17 | TBS6 | 8 | No |
| 18 | TBS6 | 16 | No |
| | | | |
| 19 | TBS1 | 4 | Yes |
| 20 | TBS1 | 8 | Yes |
| 21 | TBS1 | 16 | Yes |
| 22 | TBS2 | 4 | Yes |
| 23 | TBS2 | 8 | Yes |
| 24 | TBS2 | 16 | Yes |
| 25 | TBS3 | 4 | Yes |
| 26 | TBS3 | 8 | Yes |
| 27 | TBS3 | 16 | Yes |
| 28 | TBS4 | 4 | Yes |
| 29 | TBS4 | 8 | Yes |
| 30 | TBS4 | 16 | Yes |
| 31 | TBS5 | 4 | Yes |
| 32 | TBS5 | 8 | Yes |

*FIG. 12*

RASTER DESIGN FOR NARROWBAND OPERATION FOR MACHINE TYPE COMMUNICATIONS

CROSS-REFERENCE TO RELATED APPLICATIONS

This application is a divisional of U.S. patent application Ser. No. 15/387,970, filed Dec. 22, 2016, which claims the benefit of U.S. Provisional Application Ser. No. 62/279,652, filed Jan. 15, 2016, U.S. Provisional Application Ser. No. 62/295,132, filed Feb. 14, 2016, and U.S. Provisional Application Ser. No. 62/308,000, filed Mar. 14, 2016, each of which is assigned to the assignee hereof and hereby expressly incorporated by reference herein.

BACKGROUND

I. Field of the Disclosure

Certain aspects of the present disclosure generally relate to wireless communications and, more particularly, to design of a frequency raster for narrowband operation.

II. Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced (LTE-A) systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some UEs may be considered machine type communication(s) (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a base station (BS). The method generally includes determining, based on one or more conditions, an exact frequency location of one channel of one or more channels to perform narrowband communications with a UE. The method also includes transmitting an indication of the one or more conditions to the UE. The method further includes communicating with the UE, based at least in part on the exact frequency location of the one channel.

Certain aspects of the present disclosure provide an apparatus for wireless communications. The apparatus generally includes at least one processor, and a memory coupled to the at least one processor. The at least one processor is configured to determine, based on one or more conditions, an exact frequency location of one channel of one or more channels to perform narrowband communications with a UE. The at least one processor is also configured to transmit an indication of the one or more conditions to the UE. The at least one processor is further configured to communicate with the UE, based at least in part on the exact frequency location of the channel.

Certain aspects of the present disclosure provide an apparatus for wireless communications. The apparatus generally includes means for determining, based on one or more conditions, an exact frequency location of one channel of one or more channels to perform narrowband communications with a UE. The apparatus also includes means for transmitting an indication of the one or more conditions to the UE. The apparatus also includes means for communicating with the UE, based at least in part on the exact frequency location of the one channel.

Certain aspects of the present disclosure provide a computer-readable medium having computer executable code stored thereon. The computer executable code generally includes code for determining, by a BS, based on one or more conditions, an exact frequency location of one channel of one or more channels to perform narrowband communications with a UE. The computer executable code also includes code for transmitting, by the BS, an indication of the one or more conditions to the UE. The computer executable code further includes code for communicating by the BS with the UE, based at least in part on the exact frequency location of the one channel.

Certain aspects of the present disclosure provide a method for wireless communications by a UE. The method generally includes performing a cell search in one or more channels. The method also includes determining that a cell is present in one of the one or more channels, and determining, based on one or more conditions, an exact frequency location of the one channel for narrowband communications with a BS. The method further includes communicating with the BS, based at least in part on the exact frequency location of the one channel.

Certain aspects of the present disclosure provide an apparatus. The apparatus generally includes at least one processor and a memory coupled to the at least one processor. The at least one processor is configured to perform a cell search in one or more channels. The at least one processor is also configured to determine that a cell is present in one of the one or more channels, and determine, based on one or more conditions, an exact frequency location of the one channel for narrowband communications with a BS. The at least one processor is further configured to communicate with the BS, based at least in part on the exact frequency location of the one channel.

Certain aspects of the present disclosure provide an apparatus. The apparatus generally includes means for performing a cell search in one or more channels. The apparatus also includes means for determining that a cell is present in one of the one or more channels, and means for determining, based on one or more conditions, an exact frequency location of the one channel for narrowband communications with a BS. The apparatus further includes communicating with the BS, based at least in part on the exact frequency location of the one channel.

Certain aspects of the present disclosure provide a computer-readable medium having computer executable code stored thereon. The computer executable code generally includes code for performing, by a UE, a cell search in one or more channels. The computer executable code also includes code for determining, by the UE, that a cell is present in one of the one or more channels, and code for determining, by the UE, based on one or more conditions, an exact frequency location of the one channel for narrowband communications with a BS. The computer executable code further includes code for communicating, by the UE with the BS, based at least in part on the exact frequency location of the one channel.

Certain aspects of the present disclosure provide a method for wireless communications by a UE. The method generally includes performing a cell search in one or more channels. The method also includes determining that a cell is present in one channel of the one or more channels, and determining a frequency location of the one channel, a number of antenna ports, and a deployment mode for narrowband communications with a BS of the cell. The method further includes communicating with the BS, based at least in part on the frequency location of the one channel, the number of antenna ports, and the deployment mode.

Certain aspects of the present disclosure provide an apparatus. The apparatus generally includes at least one processor and a memory coupled to the at least one processor. The at least one processor is configured to perform a cell search in one or more channels. The at least one processor is also configured to determine that a cell is present in one channel of the one or more channels, and determine a frequency location of the one channel, a number of antenna ports, and a deployment mode for narrowband communications with a BS of the cell. The at least one processor is further configured to communicate with the BS, based at least in part on the frequency location of the one channel, the number of antenna ports, and the deployment mode.

Certain aspects of the present disclosure provide an apparatus. The apparatus generally includes means for performing a cell search in one or more channels. The apparatus also includes means for determining that a cell is present in one channel of the one or more channels, and means for determining a frequency location of the one channel, a number of antenna ports, and a deployment mode for narrowband communications with a BS of the cell. The apparatus further includes means for communicating with the BS, based at least in part on the frequency location of the one channel, the number of antenna ports, and the deployment mode.

Certain aspects of the present disclosure provide a computer-readable medium having computer executable code stored thereon. The computer executable code generally includes code for performing, by a UE, a cell search in one or more channels. The computer executable code also includes code for determining, by the UE, that a cell is present in one channel of the one or more channels, and code for determining, by the UE, a frequency location of the one channel, a number of antenna ports, and a deployment mode for narrowband communications with a BS of the cell. The computer executable code further includes code for communicating by the UE with the BS, based at least in part on the frequency location of the one channel, the number of antenna ports, and the deployment mode.

Certain aspects of the present disclosure provide a method for wireless communications by a BS. The method generally includes transmitting, to a UE, information indicative of a frequency location of a channel of one or more channels, a number of antenna ports, and a deployment mode for narrowband communications with the BS. The method also includes communicating with the UE, based at least in part on the frequency location of the channel, the number of antenna ports, and the deployment mode.

Certain aspects of the present disclosure provide an apparatus. The apparatus generally includes at least one processor and a memory coupled to the at least one processor. The at least one processor is configured to transmit to a UE information indicative of a frequency location of a channel of one or more channels, a number of antenna ports, and a deployment mode for narrowband communications with the apparatus. The at least one processor is also configured to communicate with the UE, based at least in part on the frequency location of the channel, the number of antenna ports, and the deployment mode.

Certain aspects of the present disclosure provide an apparatus. The apparatus generally includes means for transmitting, to a UE, information indicative of a frequency location of a channel of one or more channels, a number of antenna ports, and a deployment mode for narrowband communications with the apparatus. The apparatus also includes means for communicating with the UE, based at least in part on the frequency location of the channel, the number of antenna ports, and the deployment mode.

Certain aspects of the present disclosure provide a computer-readable medium having computer executable code stored thereon. The computer executable code generally includes code for transmitting by a BS to a UE information indicative of a frequency location of a channel of one or more channels, a number of antenna ports, and a deployment mode for narrowband communications with the BS. The computer executable code also includes code for communicating by the BS with the UE, based at least in part on the frequency location of the channel, the number of antenna ports, and the deployment mode.

Numerous other aspects are provided including methods, apparatus, systems, computer program products, computer-readable medium, and processing systems. To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 11 illustrates an example of a table for SIB1bis scheduling, in accordance with certain aspects of the present disclosure.

FIG. 12 illustrates an example of another table for SIB1bis scheduling, in accordance with certain aspects of the present disclosure.

To facilitate understanding, identical reference numerals have been used where possible, to designate identical elements that are common to the figures. It is contemplated that elements disclosed in one embodiment may be beneficially utilized on other embodiments without specific recitation.

DETAILED DESCRIPTION

Certain aspects of the present disclosure generally relate to design of a frequency raster for narrowband operation. As described in more detail below, aspects presented herein allow devices in a communication network to determine, based on one or more conditions, an exact frequency location of a channel for narrowband communications. Once determined, the devices may communicate based in part on the frequency location of the channel. In some aspects, devices in the network may also determine at least one of a number of antenna ports or a deployment mode for narrowband communications in the communication network. Once determined, the communication between the devices may be further based on the number of antenna ports and the deployment mode.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. LTE, LTE-A, LTE in an unlicensed spectrum (LTE-whitespace), etc. are generally referred to as LTE. For clarity, certain aspects of the techniques are described below for LTE, and LTE terminology is used in much of the description below.

Example Wireless Communication System

Figure 1:
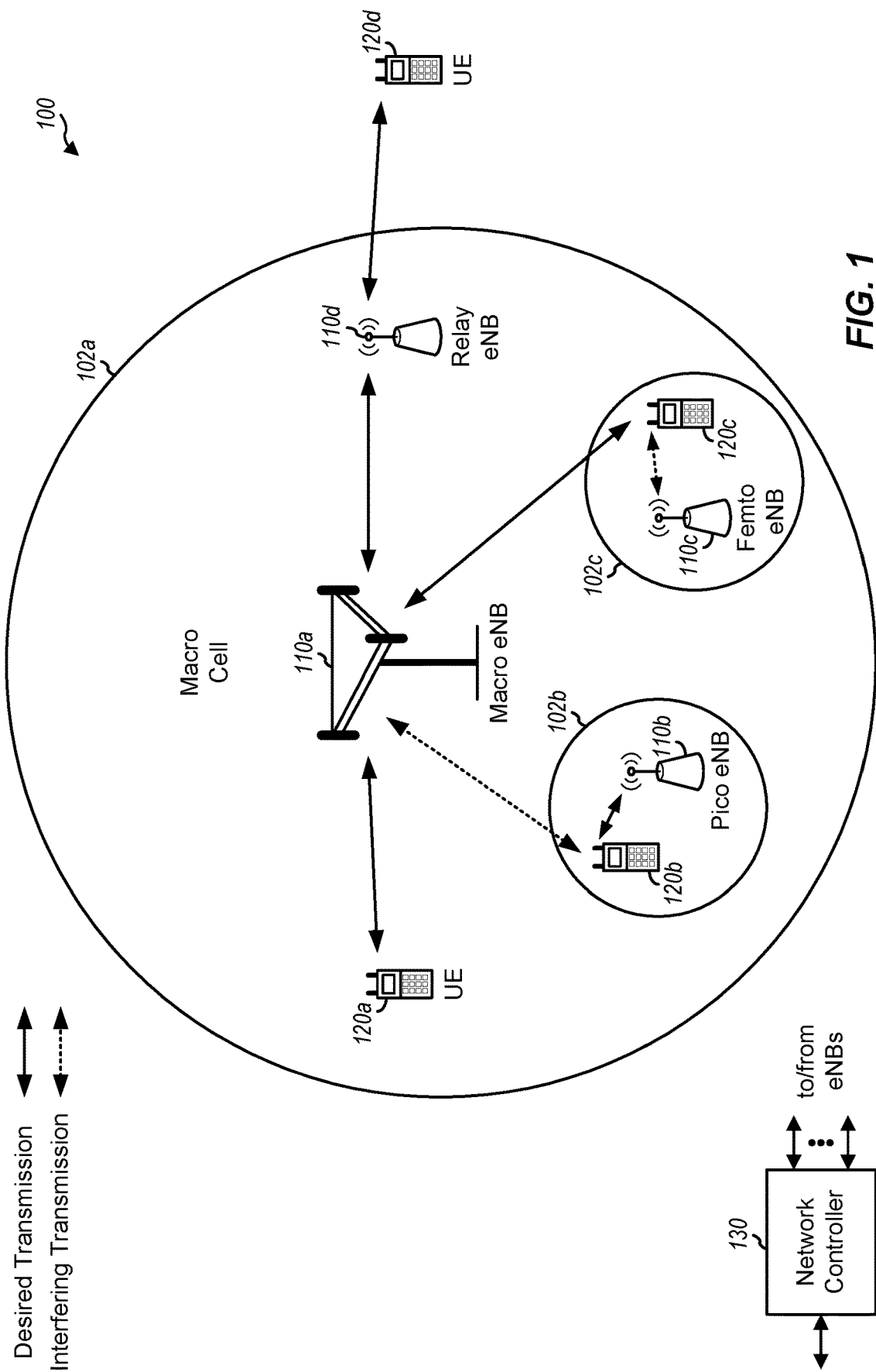
FIG. 1 is a block diagram conceptually illustrating an example of a wireless communication network, in accordance with certain aspects of the present disclosure.

FIG. 1 illustrates an example wireless communication network 100, in which aspects of the present disclosure may be practiced. For example, UEs and eNBs shown in FIG. 1 may use techniques presented herein to determine at least one of a type of deployment mode for narrowband operation or precise (e.g., exact) frequency location for narrowband communications.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, a drone, a robot/robotic device, a wearable device (e.g., smart watch, smart glasses, smart goggles, smart wristband, smart ring, smart bracelet, smart clothing), a medical device, a vehicular device, etc. Some UEs may be considered machine type communication (MTC) UEs, which may include remote devices, such as sensors, meters, location tags, monitors, drones, robots/robotic devices, etc. In general, MTC devices may include a broad class of devices in wireless communications including, but not limited to: Internet of Things (IoT) devices, Internet of Everything (IoE) devices, wearable devices and low cost devices. MTC UEs, as well as other types of UEs, may be implemented as narrowband internet of things (NB-IoT) devices. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

One or more UEs 120 in the wireless communication network 100 (e.g., an LTE network) may also be a narrowband bandwidth UE. These UEs may co-exist with legacy and/or advanced UEs (e.g., capable of operating on a wider bandwidth) in the LTE network and may have one or more capabilities that are limited when compared to the other UEs in the wireless network. For example, in LTE Rel-12, when compared to legacy and/or advanced UEs in the LTE network, the narrowband UEs may operate with one or more of the following: a reduction in maximum bandwidth (relative to legacy UEs), a single receive radio frequency (RF) chain, reduction of peak rate (e.g., a maximum of 1000 bits for a transport block size (TB S) may be supported), reduction of transmit power, rank 1 transmission, half duplex operation, etc. In some cases, if half duplex operation is supported, the narrowband UEs may have a relaxed switching timing from transmit to receive (or from receive to transmit) operations. For example, in one case, compared to a switching timing of 20 microseconds (us) for legacy and/or advanced UEs, the narrowband UEs may have a relaxed switching timing of 1 millisecond (ms).

In some cases, the narrowband UEs (e.g., in LTE Release 12 and beyond, e.g., 5G releases) may also be able to monitor downlink (DL) control channels in the same away as legacy and/or advanced UEs in the LTE network monitor DL control channels. For example, Release 12 narrowband UEs may still monitor downlink (DL) control channels in the same way as regular UEs, for example, monitoring for wideband control channels in the first few symbols (e.g., physical downlink control channel (PDCCH)) as well as narrowband control channels occupying a relatively narrowband, but spanning a length of a subframe (e.g., enhanced PDCCH (ePDCCH)).

Narrowband UEs may be limited to a particular narrowband assignment of 1.4 MHz or six resource blocks (RBs) partitioned out of the available system bandwidth) while co-existing within a wider system bandwidth (e.g., at 1.4/3/5/10/15/20 MHz). Additionally, narrowband UEs may also be able to support one or more coverage modes of operation. For example, the narrowband UE may be able to support coverage enhancements up to 15 dB.

As used herein, devices with limited communication resources, e.g. smaller bandwidth, may be referred to generally as narrowband UEs. Similarly, legacy devices, such as legacy and/or advanced UEs (e.g., in LTE) may be referred to generally as wideband UEs. Generally, wideband UEs are capable of operating on a larger amount of bandwidth than narrowband UEs.

In some cases, a UE (e.g., a narrowband UE or a wideband UE) may perform a cell search and acquisition procedure before communicating in the network. In one case, with reference to the LTE network illustrated in FIG. 1 as an example, the cell search and acquisition procedure may be performed when the UE is not connected to a LTE cell and wants to access the LTE network. In these cases, the UE may have just powered on, restored a connection after temporarily losing connection to the LTE cell, etc.

In other cases, the cell search and acquisition procedure may be performed when the UE is already connected to a LTE cell. For example, the UE may have detected a new LTE cell and may prepare a handover to the new cell. As another example, the UE may be operating in one or more low power states (e.g., may support discontinuous reception (DRX)) and, upon exiting the one or more low power states, may have to perform the cell search and acquisition procedure (even though the UE is still in connected mode).

Figure 2:
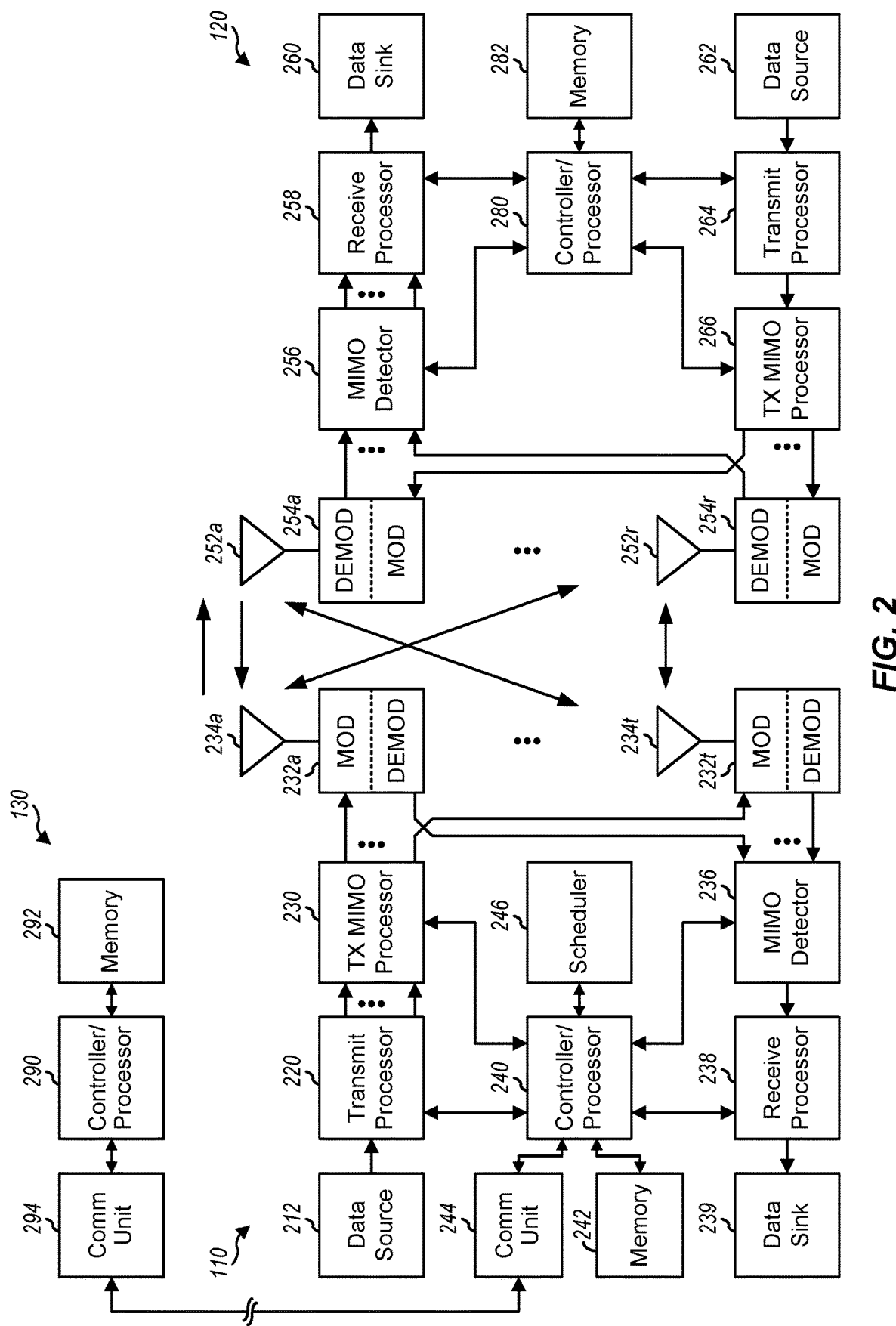
FIG. 2 shows a block diagram conceptually illustrating an example of a base station in communication with a user equipment (UE) in a wireless communications network, in accordance with certain aspects of the present disclosure.

FIG. 2 shows a block diagram of a design of BS/eNB 110 and UE 120, which may be one of the BSs/eNBs and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at BS 110 and UE 120, respectively. For example, controller/processor 280 and/or other processors and modules at UE 120, may perform or direct operations 700 shown in FIG. 7, operations 1000 shown in FIG. 10 and/or other processes for the techniques described herein. Controller/processor 240 and/or other processors and modules at BS 110 may perform or direct operations 600 shown in FIG. 6, operations 900 shown in FIG. 9 and/or other processes for the techniques described herein. Memories 242 and 282 may store data and program codes for BS 110 and UE 120, respectively. A scheduler 246 may schedule UEs for data transmission on the downlink and/or uplink.

Figure 3:
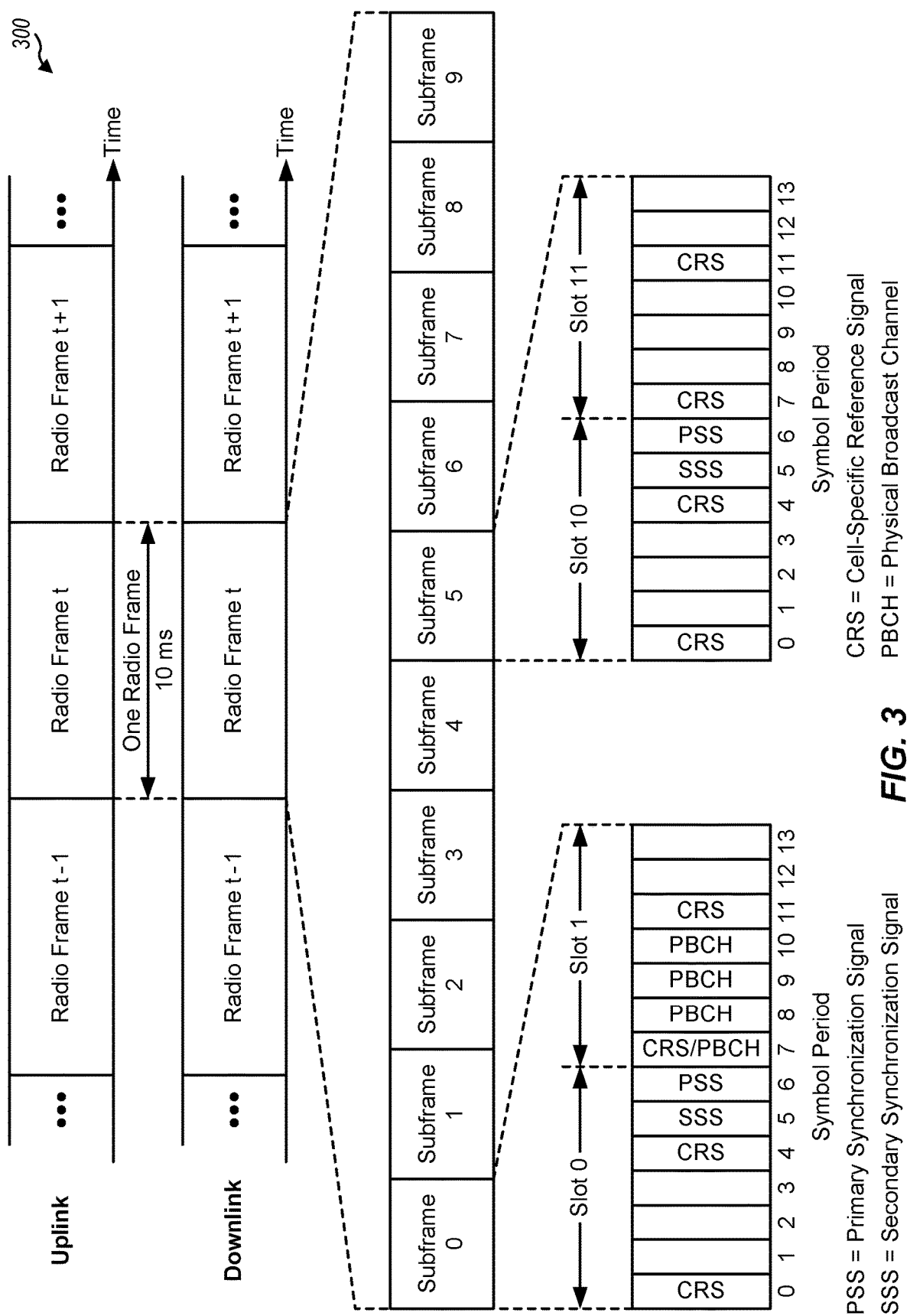
FIG. 3 shows an exemplary frame structure for frequency division duplexing (FDD) in long term evolution (LTE).

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition and may contain, among other information, the cell ID along with an indication of the duplexing mode. The indication of the duplexing mode may indicate whether the cell utilizes a time division duplexing (TDD) or frequency division duplexing (FDD) frame structure. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Channel quality measurements may be performed by a UE according to a defined schedule, such one based on the DRX cycle of the UE. For example, a UE may attempt to perform measurements for a serving cell at every DRX cycle. The UE may also attempt to perform measurements for non-serving neighboring cells. Measurements for non-serving neighbor cells may be made based on a different schedule than for serving cells and the UE may need to tune away from the serving cell to measure non-serving cells when the UE is in connected mode.

To facilitate channel quality measurements, an eNB may transmit a cell specific reference signal (CRS) on specific subframes. For example, an eNB may transmit CRS over subframes 0 and 5 for a given frame. A narrowband UE may receive this signal and measure the average power of the received signal, or RSRP. The narrowband UE may also calculate a Receive Signal Strength Indicator (RSSI) based on the total received signal power from all sources. A RSRQ may be also be calculated based on the RSRP and RSSI.

To facilitate measurements, an eNB may provide a measurement configuration to UEs in its coverage area. The measurement configuration may define event triggers for measurement reporting and each event trigger may have associated parameters. When the UE detects a configured measurement event, it may respond by sending a measurement report to the eNB with information about the associated measurement objects. A configured measurement event may be, for example, a measured reference signal received power (RSRP) or a measured reference signal received quality (RSRQ) satisfying a threshold. A time-to-trigger (TTT) parameter can be used to define how long a measurement event must persist before the UE sends its measurement report. In this way, the UE can signal changes in its radio conditions to the network.

Figure 4:
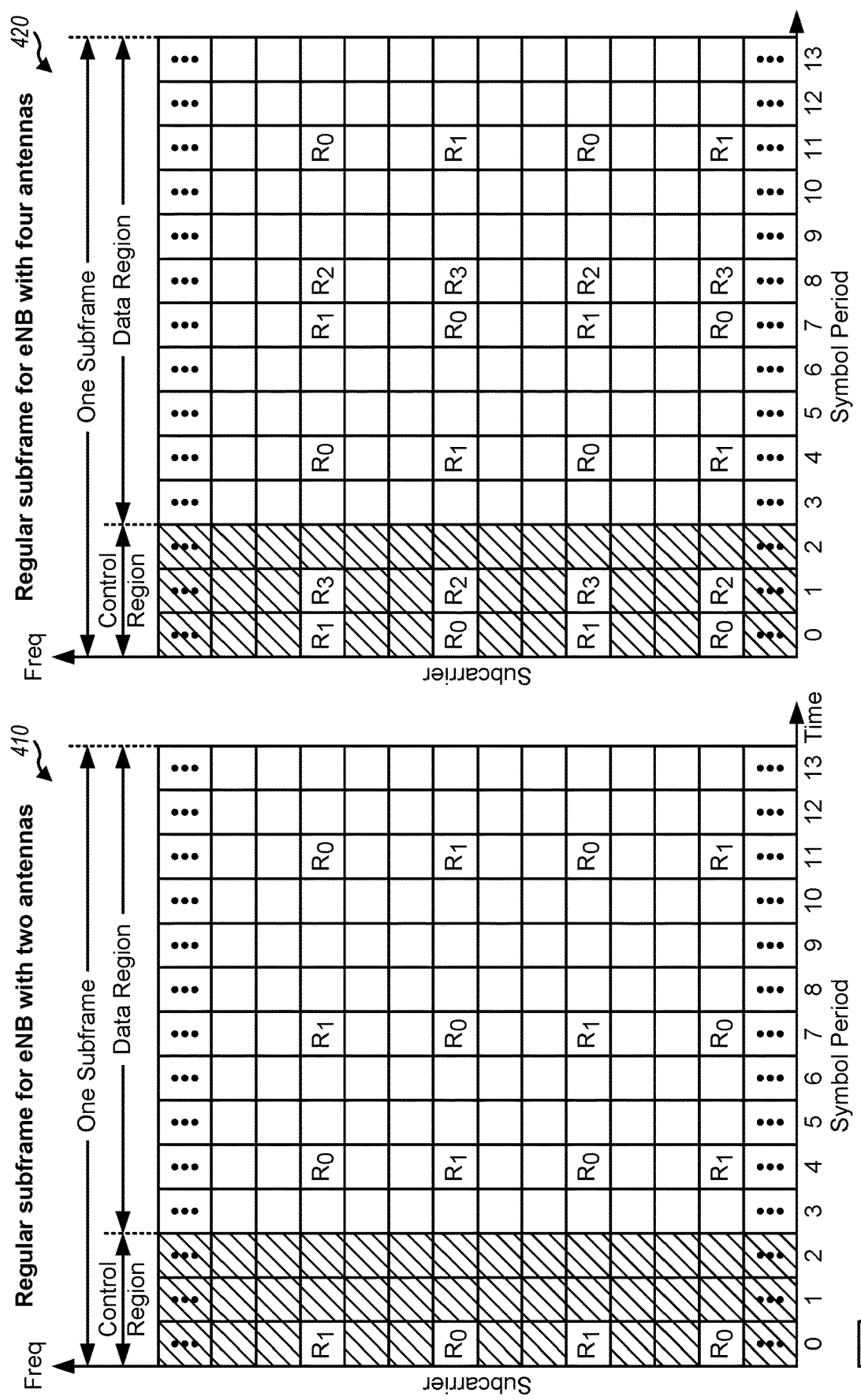
FIG. 4 shows two exemplary subframe formats with the normal cyclic prefix.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−}.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Example Narrowband Communications

The focus of traditional LTE design is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

However, as described above, one or more UEs in the wireless communication network (e.g., wireless communication network 100) may be devices that have limited communication resources, such as narrowband UEs, as compared to other (wideband) devices in the wireless communication network. For narrowband UEs, various requirements may be relaxed as only a limited amount of information may need to be exchanged. For example, maximum bandwidth may be reduced (relative to wideband UEs), a single receive radio frequency (RF) chain may be used, peak rate may be reduced (e.g., a maximum of 100 bits for a transport block size), transmit power may be reduced, Rank 1 transmission may be used, and half duplex operation may be performed.

The wireless communication network may support a 180 kHz deployment for narrowband operation (e.g., MTC/eMTC, narrowband internet of things (NB-IoT)) with different deployment modes. In one example, narrowband operations may be deployed in-band, for example, using resource blocks within a wider system bandwidth. In this deployment, narrowband operations in one case may use one resource block within the wider system bandwidth of an LTE network. In such a case, the 180 kHz bandwidth for the resource block may have to be aligned with a wideband LTE resource block. In another example, narrowband operations may be deployed in a standalone mode of operation. In this deployment, narrowband communications may reuse the GSM carrier, which can be placed anywhere in a 100 kHz raster. In yet another example, narrowband operations may be deployed in the unused resource blocks within a LTE carrier guard-band. In this deployment, the 180 kHz RB within the guard band may have to be aligned with a 15 kHz tone grid of wideband LTE, for example, in order to use the same FFT and/or reduce interference with respect to in-band legacy LTE communications.

A 100 kHz frequency raster is considered for NB-IoT. A frequency (or channel) raster generally refers to the steps or frequencies that can be used by a communication device, such as a narrowband or NB-IoT device (e.g., in order to search for channels used by a cell). Thus, a 100 kHz channel raster would generally mean that the center frequency that can be used for narrowband communications is a multiple of 100 kHz (e.g., any frequency of the form 100 kHz*n).

Figure 5:
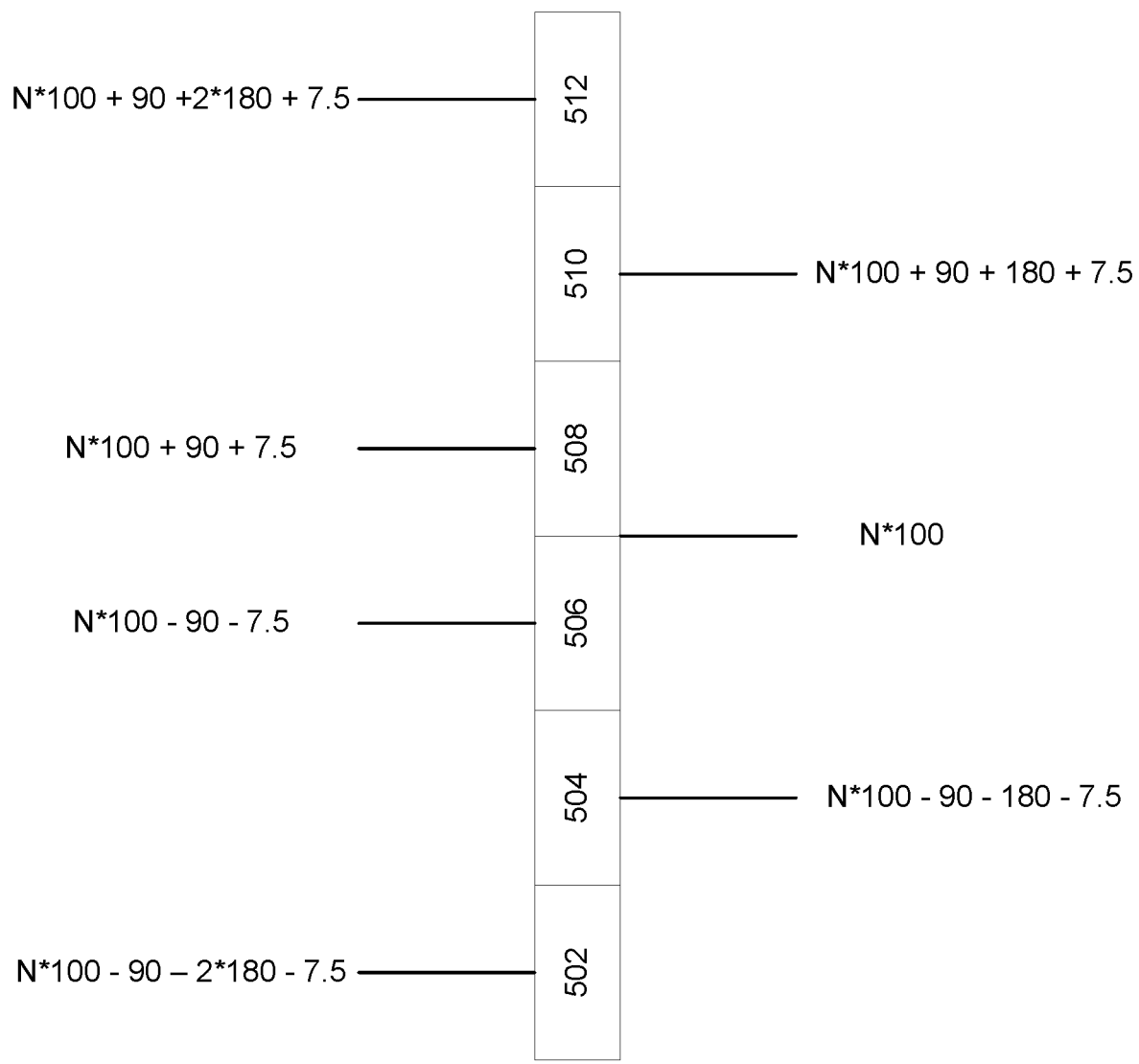
FIG. 5 illustrates an example system where the frequency raster is different than the channel bandwidths, in accordance with certain aspects of the present disclosure.

A 100 kHz frequency raster, however, may not be suitable for some of the deployment modes for NB-IoT. For example, a 100 kHz frequency raster may not be suitable for in-band deployment, because legacy LTE follows a 100 kHz raster, but the RB structure (e.g., for NB-IoT) introduces steps of 180 kHz plus a 7.5 kHz offset due to the DC (direct current) subcarrier. FIG. 5 illustrates one example six resource block system (with RBs 502-512), in which a 100 kHz frequency raster is used with 180 kHz resource blocks. As shown, due in part to the half-subcarrier DC shift, none of the center frequencies for RBs 502-512 are in a multiple of the raster frequency (e.g., 100 kHz*N). Rather, as shown, for in-band and guard band, the possible frequency offsets are +−2.5 kHz, and +−7.5 kHz.

However, even though none of the center RB frequencies are in a multiple of the raster frequency, because the two center RBs 506 and 508 are 2.5 kHz apart from the raster frequency, a UE may be able to lock on to them and estimate a 2.5 kHz frequency offset. Although the UE may be able to get the correct frequency offset in this situation, synchronizing to these frequencies may create a timing drift for the UE (e.g., if the timing and frequency oscillator share the same clock).

Example Channel Raster Design for Narrowband Operation

Aspects of the present disclosure provide a raster design for channels, which may be detected by devices that communicate using relative narrowband regions of system bandwidth, such as NB-IoT devices. In particular, the techniques presented herein allow devices (e.g., UEs, eNBs, etc.) to determine an exact (or precise) frequency location (or position) of a channel for narrowband communications, based on one or more conditions.

Figure 6:
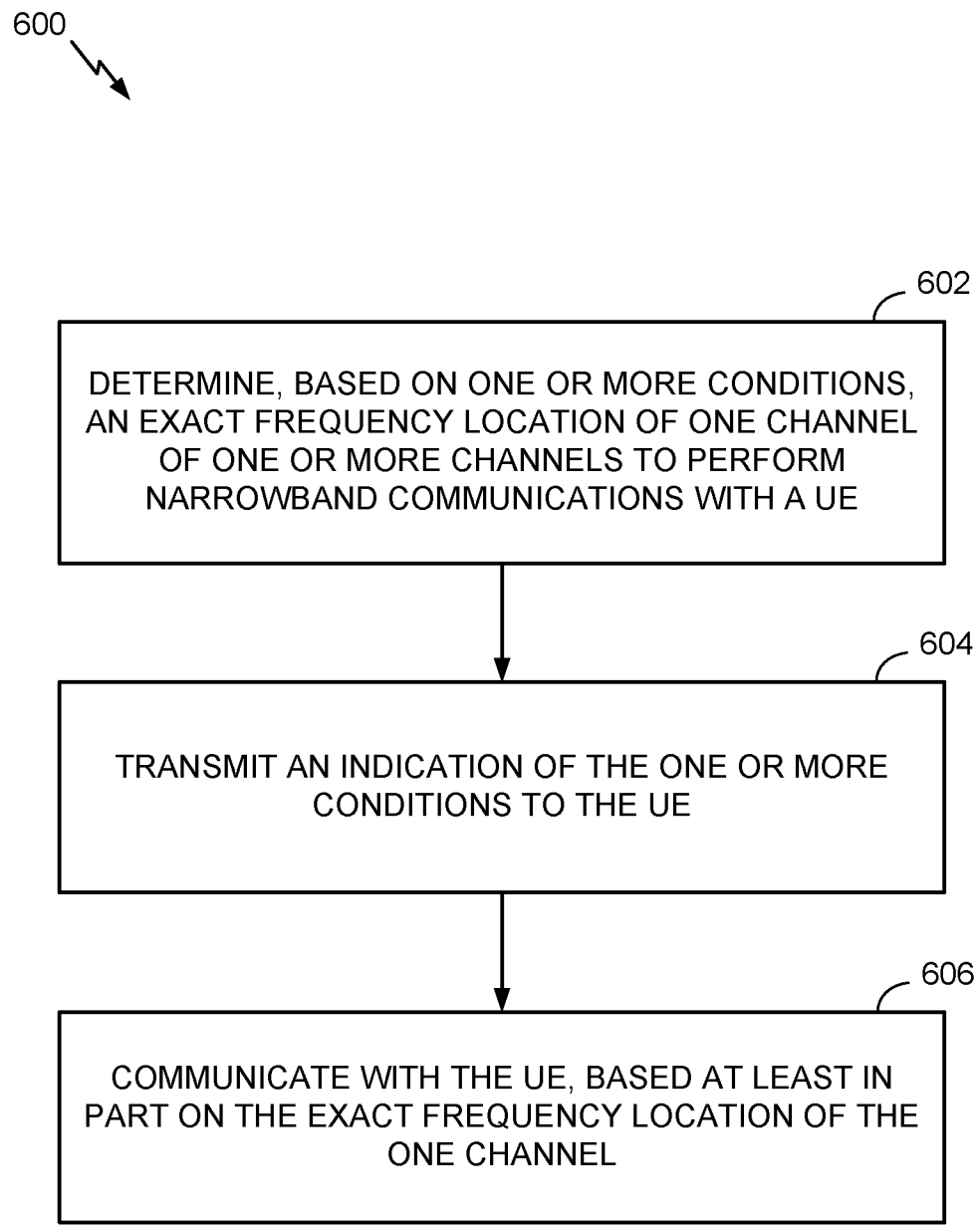
FIG. 6 illustrates example operations that may be performed by a base station (BS), in accordance with certain aspects of the present disclosure.

FIG. 6 illustrates example operations 600 for wireless communications, in accordance with certain aspects of the present disclosure. The operations 600 may be performed, for example, by a BS (e.g., eNB 110).

The operations 600 begin, at 602, by the BS determining, based on one or more conditions, an exact frequency location of one channel of one or more channels to perform narrowband communications with a UE (e.g., UE 120). At 604, the BS transmits an indication of the one or more conditions to the UE. At 606, the BS communicates with the UE, based at least in part on the exact frequency location of the one channel.

Figure 7:
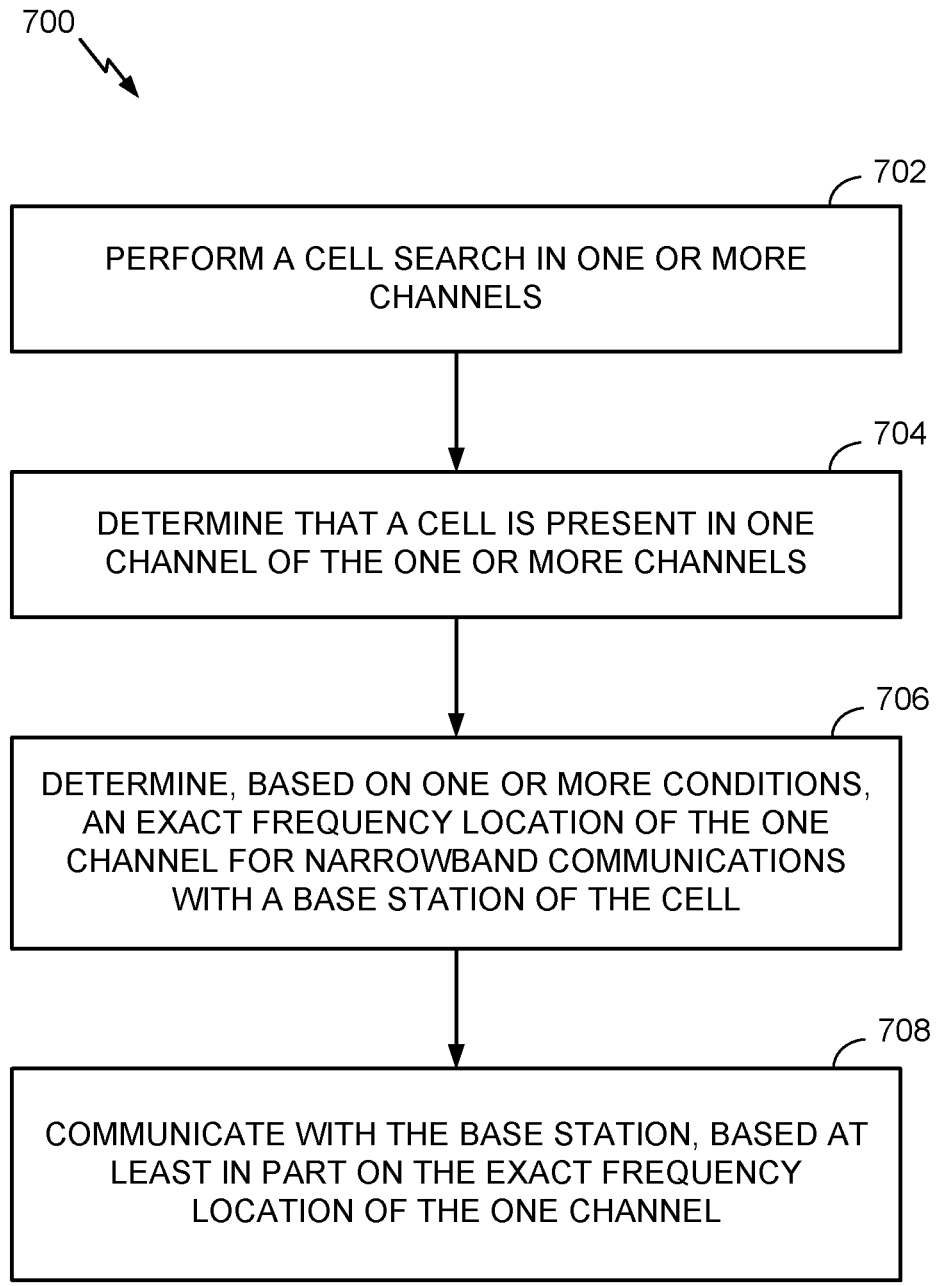
FIG. 7 illustrates example operations that may be performed by a user equipment (UE), in accordance with certain aspects of the present disclosure.

FIG. 7 illustrates example operations 700 for wireless communications, in accordance with certain aspects of the present disclosure. The operations 700 may be performed, for example, by a UE (e.g., UE 120).

The operations 700 begin, at 702, by the UE performing a cell search in one or more channels. In one aspect, the UE may perform the cell search in the one or more channels based on the raster frequency. For example, if the raster frequency is 100 kHz, the UE may monitor for PSS/SSS every 100 kHz in order to acquire frequency, timing, and/or system information. In some cases, the one or more channels in which the UE performs the cell search may be based on a rough frequency estimation. At 704, the UE determines that a cell is present in one channel of the one or more channels. At 706, the UE determines, based on one or more conditions, the exact (or precise) frequency location of the one channel for narrowband communications with a base station of the cell. At 708, the UE communicates with the base station based at least in part on the exact frequency location of the one channel.

According to certain aspects, the one or more conditions may include a given operating bandwidth. In this aspect, the UE and/or BS may determine that there is one anchor channel (or resource block) location in which narrowband communications may be deployed for a given bandwidth. Once determined, the UE and/or BS may determine the exact frequency location by selecting the anchor channel that corresponds to the given operating bandwidth. In this manner, the techniques herein can substantially reduce the hypothesis for cell searching.

Additionally or alternatively, according to certain aspects, the one or more conditions may include a cell identifier (ID). For example, once the UE determines the cell ID (e.g., from PSS and SSS), the UE may select the anchor channel location based in part, on the cell ID. In one implementation, the UE and/or BS may determine the precise anchor location according to the following:

$$\text{Anchor RB} = \text{cell ID mod(number of possible RBs)} \quad (1)$$

where the cell ID is determined from PSS and SSS, and wherein the number of possible RBs may be based on the system bandwidth. For example, for a system bandwidth of 20 MHz, there may be four possible RBs (such as RB 0, RB 10, RB 20 and RB 40). By using the above equation, the UE may determine the anchor RB being used by the current cell.

According to certain aspects, there may be more than one anchor RB defined. In these cases, the UE may select the anchor RB location from a set of anchor channels at or near raster frequency locations. For example, the UE may select the RBs that are close to the raster frequency to obtain a first subset of RBs. The UE may then down-select the first subset of RBs to obtain a second subset of RBs. In some cases, the UE may down-select the first subset of RBs based on the cell ID. In some cases, the down-selection may be determined according to a communication standard (e.g., defined in a LTE specification). Once the UE obtains the second subset, the UE may determine which RB in the second subset is being used from broadcast signaling (e.g., one or more bits in MIB/SIB, etc.) transmitted by the BS.

According to certain aspects, the network/BS may choose to whether to use one fixed anchor RB location for every operating bandwidth or to base the anchor RB on its cell ID. In some cases, the BS may decide to use a fixed anchor RB location in order to have all narrowband communications deployed in the same frequency. In some cases, the BS may decide to use an anchor RB that is based on the cell ID in order to reduce inter-cell interference. In either case, the BS may indicate to the UE the exact frequency location (e.g., if the BS determines that the anchor RB location will use a fixed RB) or indicate to the UE that the UE should determine the exact frequency location based on the cell ID. Such indication may be provided via broadcast signalling (e.g., 1 bit in PBCH/MIB).

In some cases, the BS may not transmit (or signal) an indication to the UE as to how the BS will select the anchor RB location. In these cases, the UE can blindly try different CRS sequences for the different RBs to determine which RB is used as the anchor. For example, when performing the blind detection, the UE may choose the RB that has the best correlation with the observed CRS.

According to some aspects, the one or more conditions may include a type of deployment for the narrowband communications. In one aspect, the type of deployment may be based on a number of antenna ports used by the BS. The BS, for example, may include information about the number of legacy CRS antenna ports in the PBCH, and transmit the PBCH to the UE. In one case, if the UE receives an indication that the number of antenna ports is greater than 0 (e.g., 1 port, 2 ports, or 4 ports), the UE may determine that narrowband communications are being deployed in-band. In one case, if the UE receives an indication that the number of antenna ports is 0, the UE may determine that narrowband communications are being deployed in dedicated spectrum (for a standalone deployment) or in the guard band.

In certain aspects, the BS may signal an indication of the one or more conditions via the master information block (MIB) that is transmitted in PBCH. The MIB may carry, for example, a 3-bit field that indicates the bandwidth of the cell; however all of the values may not be used. For example, in some cases, only 6 values may be used to indicate the bandwidth. According to certain aspects, based on how the 3 bit field in MIB is interpreted, the UE and/or BS may determine different types of information regarding the narrowband communications deployed in cell.

In one aspect, the BS may use one additional value out of the 6 values (of the 3-bit field in MIB) to signal a particular bandwidth that indicates standalone deployment. In one case, for example, the BS may use one additional value to signal bandwidth equal to 200 kHz in order to indicate a standalone deployment for the narrowband communications. For the guard band case, the BS can provide to the UE signalling that indicates the true bandwidth value of the corresponding system (e.g., 20 MHz in one case for LTE). If the guard-band location is fixed for every resource block, then the UE would be able to determine (from the signalling) all the information it needs to acquire the cell.

In another aspect, the BS may use the 3-bit field to signal different types of information based on the number of antenna ports. The UE, in turn, may also interpret the 3 bit field differently based on the number of antenna ports, which may be signaled separately by the BS. For example, if the number of antenna ports is greater than zero (and thus indicates in-band), the BS may use the 3-bit field to signal the bandwidth, and the UE may determine (based on the indication of the number of antenna ports) that the field signals the bandwidth. In this case, the UE may be able to determine the absolute frequency value (e.g., the anchor RB) using any of the above techniques. In one example, if the number of antenna ports is equal to zero (and thus indicates guard band or standalone), the BS may use the 3-bit field to indicate the frequency offset with respect to a frequency grid (e.g., 100 kHz frequency grid), and the UE may determine (based on the indication of the number of antenna ports) that the field signals the offset with respect to the frequency grid. For example, the BS can signal frequency offset values of −7.5, 7.5, −2.5, 2.5, and 0. In this case, signaling a frequency offset of 0 may imply a standalone deployment, whereas signalling another value may imply a guard band deployment.

Note that although the aspects presented herein describe the BS signaling to the UE various information (e.g., such as antenna ports, frequency offset, bandwidth, etc.) in PBCH that the UE may use to determine a frequency location (e.g., anchor RB) and/or type of deployment, such information may also be indicated in other signals, such as PSS, SSS, etc., or combination of signals (e.g., split between PSS, SSS, MIB, PBCH, and other signals).

As mentioned above, for in-band deployment, the UE may not receive signaling that indicates the frequency offset, since the UE can derive the frequency offset based on an indication of the anchor RB.

According to certain aspects, however, the BS may be configured to always signal the frequency offset with respect to the frequency grid (e.g., 100 kHz grid) regardless of the deployment type. Thus, in situations where narrowband communications are being deployed in-band, the UE may not know which RB is being used, which could prevent the UE from using CRS.

As such, in some aspects, after receiving an indication of the frequency offset, the UE may receive an indication of the absolute RB position via a SIB. In some aspects, after receiving an indication of the frequency offset the UE may receive an indication of the RB offset plus the anchor RB. In one example, the BS may signal five possibilities of the RB offset, which may include +−2.5, +−7.5, and 0. In one example, the BS may signal three possibilities of the RB offset, which may include >0, <0, or 0.

Figure 8:
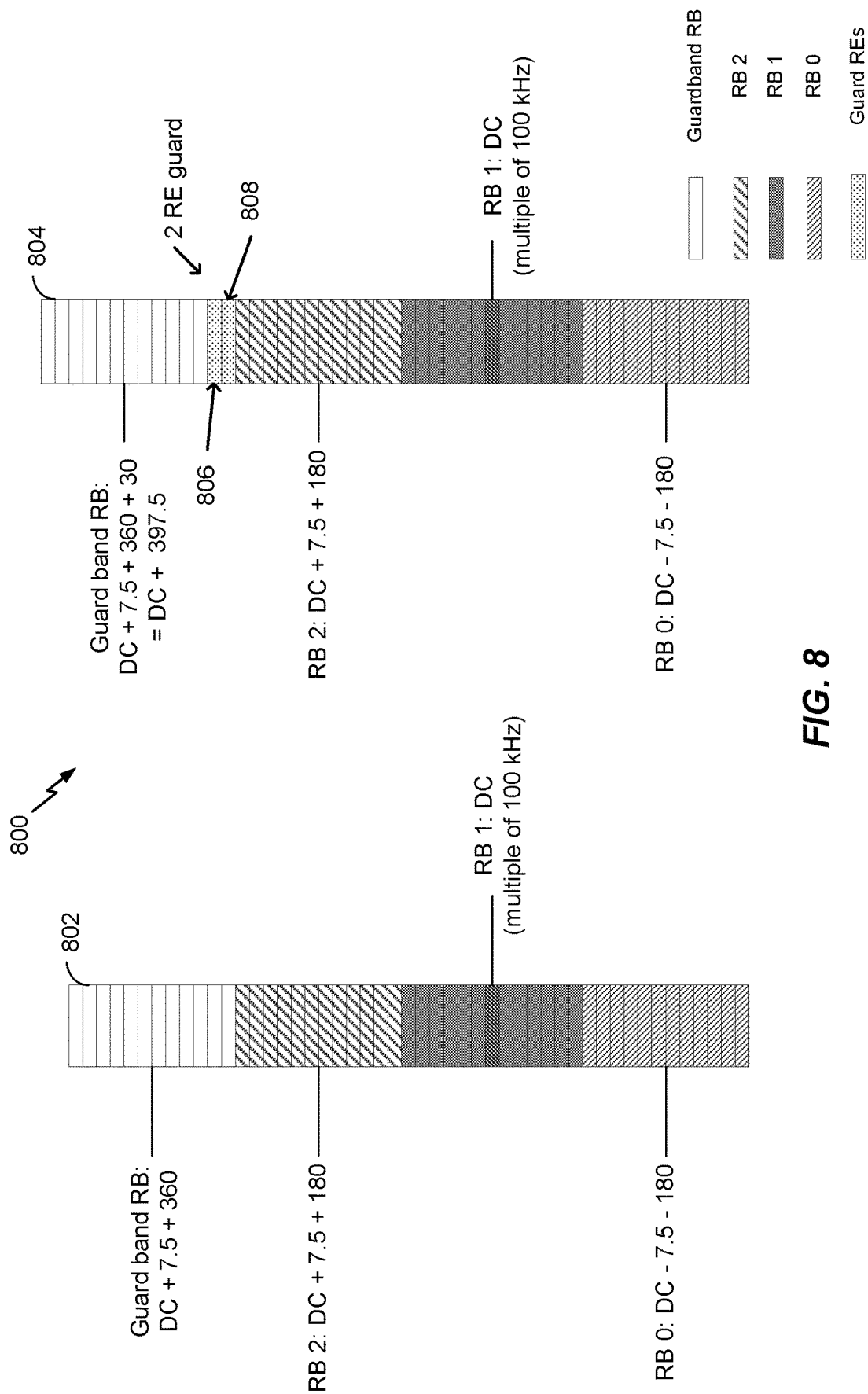
FIG. 8 illustrates an example of applying a tone shift to align with a raster frequency, in accordance with certain aspects of the present disclosure.

Additionally, in some aspects, if the deployment type is known (e.g., by the BS and/or UE), the guard band offset can be fixed to a constant value. For example, the narrowband communications may be fixed to RBs with a center frequency of 7.5 kHz with respect to the 100 kHz raster. Thus, the guard band may not have to be aligned with the physical resource block boundary, but may have to be aligned with the 15 kHz boundary in order to reuse the same IFFT. FIG. 8, for example, illustrates one example (for a 3 resource block system) of leaving one or more guard tones to align with the frequency raster.

As shown in FIG. 8, in a system 800 including three RBs (e.g., RB 0, RB 1, RB 2), the guard band RB 802 is placed at DC+367.5 kHz. As this frequency is not close (e.g., not within some offset) to a raster frequency, the first guard band RB 802 may not be used for narrowband communications. Aspects of the present disclosure, therefore, allow the BS to place one or more guard tones to align the guard band with a raster frequency. For example, as also shown in FIG. 8, for the guard band RB 804, two tones (REs) 806 and 808 (e.g., a 30 kHz gap) are placed in the guard band RB 804, so that the center frequency is placed at DC+397.5 kHz. Because this frequency is placed within a 2.5 kHz offset of the raster frequency, the UE can detect the frequency, for example, when searching for DC+400 kHz.

According to certain aspects, the BS may know that the UE is going to search for a particular raster frequency (e.g., such as 100 kHz). Thus, in these cases, the BS may apply a frequency shift to align transmission of a PSS and a SSS with a raster frequency. For example, the BS can apply a fake frequency shift (e.g., +−2.5 kHz, +−7.5 kHz) such that the frequency estimated from PSS/SSS matches the true frequency. Put differently, the BS may attempt to center the sync signal(s) to the raster frequency.

In some aspects, if the BS applies a fake frequency shift, the UE, when decoding PBCH, may shift the PBCH and the corresponding CRS to match the fake frequency shift (e.g., 2.5 kHz, 7.5 kHz, etc.). In some aspects, the BS may signal the shift in SSS, so that the UE can correct the frequency shift before decoding PBCH.

In some cases, a small subset of RBs may be allocated using the techniques described above. For example, for a 15 RB system, RB index 0 may be at DC, RB index 1 may be at 187.5 kHz, RB index 2 may be at 367.5 kHz, RB index 3 may be at 547.5 kHz, RB index 4 may be at 727.5 kHz, RB index 5 is at 907.5 kHz, RB index 6 is at 1087.5 kHz, and RB index 7 is at 1267.5 kHz. In this case, only RB index 5 would lie close enough to the raster frequency to be detected by a UE.

According to certain aspects, the BS may apply a tone shift to align transmission of a PSS and SSS with a raster frequency. For example, a tone shift can be applied to the PSS/SSS to allow the UE to detect other additional frequencies in the subset of RBs. In one aspect, a tone shift of +−1 RE (e.g., 15 kHz) can be applied to the PSS/SSS. For example, if a tone shift of +15 kHz were applied to each of the above RB indexes, RB index 1 would then lie close enough to the raster frequency to be detected by UE (e.g., RB index 1+15 kHz=202.5). Similarly, RB index 6 would lie close enough to the raster frequency to be detected by the UE (e.g., RB index 6+15 kHz=1102.5).

In one aspect, the UE may determine the exact frequency location based on decoding PSS and SSS. In one aspect, the UE may obtain signaling indicating the tone shift and may use the signaled tone shift when decoding a PBCH. For example, in one embodiment, after the UE decodes PSS and SSS, the UE may have to resolve the ambiguity related to the offset, otherwise the UE may not be able to rate match around legacy CRS correctly. According to certain aspects, the UE may take one or more actions to resolve such ambiguity. In one example, the UE may receive an indication of the tone shift via SSS, such that the UE can know the correct CRS puncturing when decoding PBCH. In one example, the UE may receive an indication of the tone shift in PBCH. However, in order to make PBCH decodable without knowing the position of legacy CRS, the UE may have legacy CRS puncture PBCH, and the narrowband reference signal position may take the offset into account. Alternatively, instead of receiving signaling that indicates the tone shift, the UE may try different blind decoding attempts for different frequency offset hypothesis.

According to certain aspects, the raster frequencies can be clustered (e.g., non uniformly distributed) throughout the system bandwidth. For example, the frequencies can be of the form {N*100 kHz, N*100 kHz+10 kHz, N*100 kHz−10 kHz}.

According to certain aspects, the NB-IoT channel may be deployed in-band, using RBs that are close to the 100 kHz raster frequency grid. In this case, the eNB may signal the frequency location based on the constraint that only a subset of the RBs may be available for NB-IoT transmission.

Figure 9:
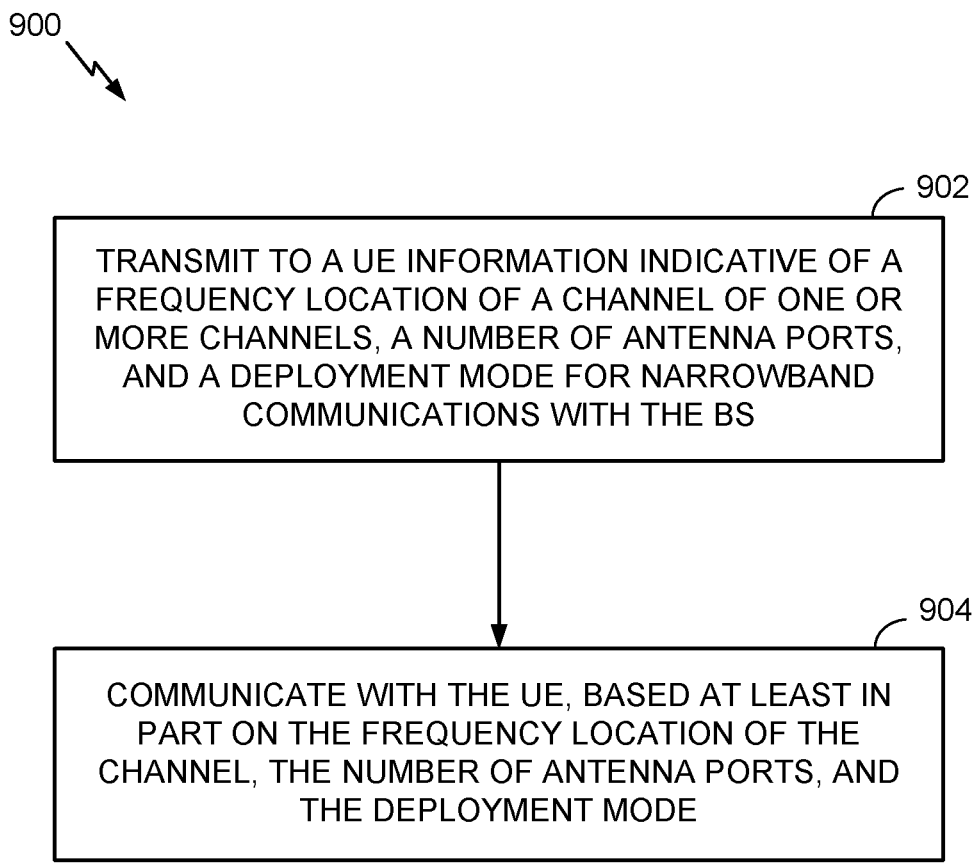
FIG. 9 illustrates example operations that may be performed by a BS, in accordance with certain aspects of the present disclosure.

FIG. 9 illustrates example operations 900 for wireless communications, in accordance with certain aspects of the present disclosure. The operations 900 may be performed, for example, by a BS (e.g., eNB 110).

The operations 900 begin, at 902, by the BS transmitting to a UE information indicative of a frequency location of a channel of one or more channels, a number of antenna ports, and a deployment mode for narrowband communications with the BS. At 904, the BS communicates with the UE, based at least in part on the frequency location of the channel, the number of antenna ports, and the deployment mode.

Figure 10:
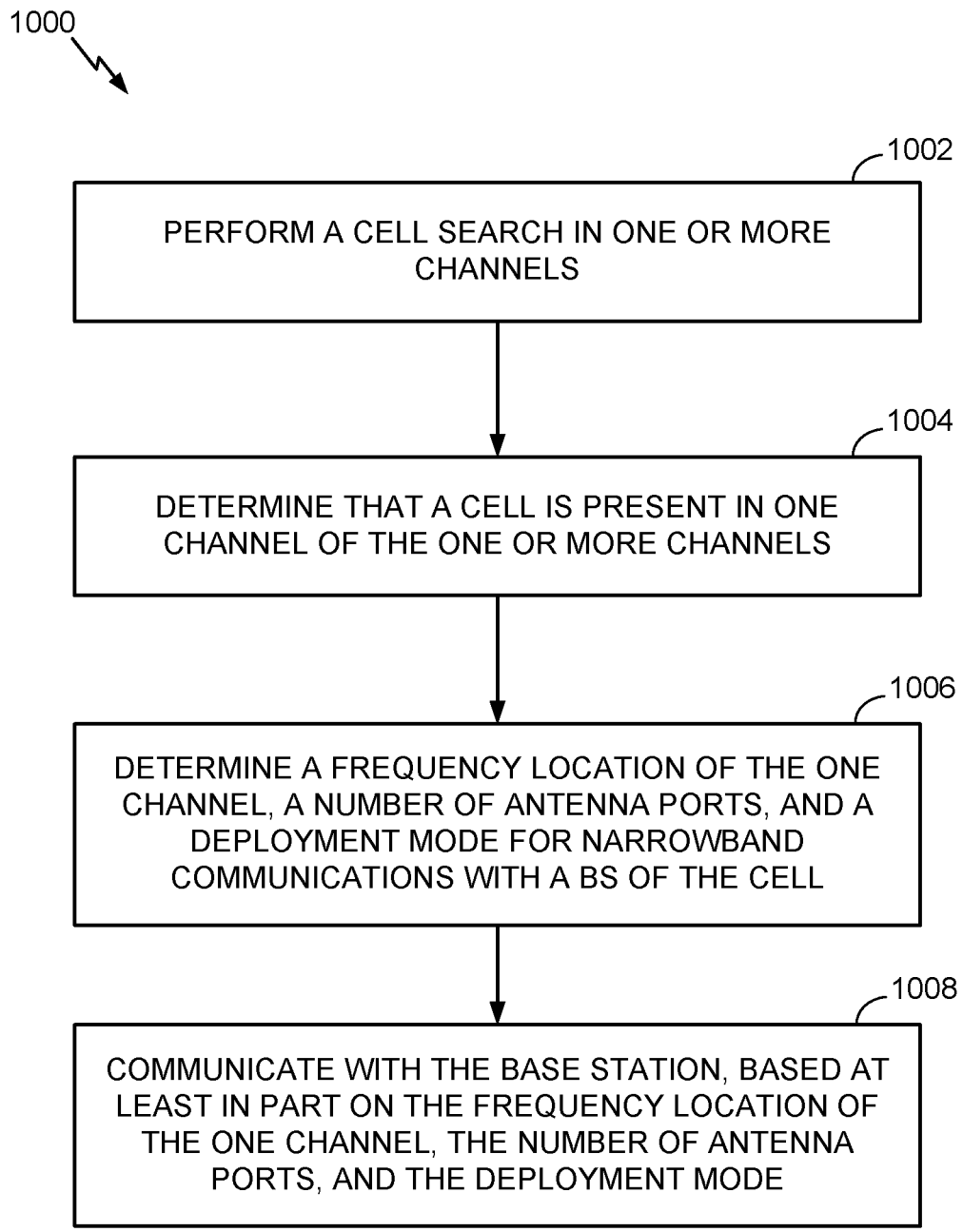
FIG. 10 illustrates example operations that may be performed by a UE, in accordance with certain aspects of the present disclosure.

FIG. 10 illustrates example operations 1000 for wireless communications, in accordance with certain aspects of the present disclosure. The operations 1000 may be performed, for example, by a UE (e.g., UE 120).

The operations 1000 begin, at 1002, by the UE performing a cell search in one or more channels. At 1004, the UE determines that a cell is present in one channel of the one or more channels. At 1006, the UE determines a frequency location of the one channel, a number of antenna ports, and a deployment mode for narrowband communications with a BS of the cell. At 1008, the UE communicates with the BS, based at least in part on the frequency location of the one channel, the number of antenna ports, and the deployment mode.

In some aspects, the BS may signal at least one of a deployment mode, frequency location (or position) of the one channel, a number of CRS antenna ports or a same cell ID indicator in the MIB. For example, the BS may use one or more fields of the MIB to signal the information to the UE. In one aspect, the number of antenna ports may be determined based at least in part on a first field in the MIB. The frequency location of the channel may be determined based in part on the first field in the MIB and second field in the MIB. The deployment mode may be determined based in part on the first field in the MIB and second field in the MIB.

In some cases, the one channel may be located in a narrowband region of wider system bandwidth, and the UE may use the same cell ID indicator to determine if the cell ID of the cell in which the BS is located is the same as a cell ID for a wideband cell that uses the wider system bandwidth. Using LTE as a reference example, the UE may use the same cell ID indicator to determine if the cell ID for NB-IoT is the same as the cell of wideband LTE.

As noted above, the MIB may include a first field to indicate the number of CRS antenna ports. In some cases, the number of CRS antenna ports may be one of 0, 1, 2 or 4. As noted above, in such cases, signalling 0 CRS antenna ports may be interpreted as the deployment being standalone or guard band, and signalling a positive number (e.g., greater than 0) of CRS ports may be interpreted as in-band deployment.

In one aspect, the MIB may include a second field to indicate a same/different physical cell ID (PCID) and may include a third field to indicate the bandwidth and/or deployment mode. For example, the second field may be one bit, indicating if the PCID is the same (e.g., 1) or different (e.g., 0). The third field may include a plurality of bits, and its meaning may depend on the number of CRS antenna ports. For example, if the number of CRS antenna ports is 0, this third field may signal the offset with respect to the raster frequency (e.g., a multiple of 100 kHz) as {−7.5, −2.5, 0, 2.5, 7.5}, with an offset of 0 meaning standalone deployments and other offset values corresponding to guard band deployment. If the number of CRS antenna ports is 1, the third field may signal the offset of a resource block with respect to a center frequency.

In some aspects, determining the frequency location of the channel may include determining a frequency offset with respect to a raster frequency based in part on the second field in the MIB, and determining the frequency position based in part on the frequency offset. In some aspects, determining the frequency location of the channel may include determining a physical resource block (PRB) position with respect to a center frequency of a wideband cell based on the second field in the MIB, and determining the frequency location based in part on the PRB position.

For example, the second field in the MIB may be used to jointly indicate a same/different PCID and a frequency/deployment mode. If the number of CRS ports is 0, then the second field may indicate the offset with respect to raster frequency as indicated above. If the number of CRS ports is greater than zero, then a first subset of the entries in the second field may be reserved to signal that the PCID is different, plus possible offsets (e.g., the 5 noted above) with respect to the raster frequency. A second subset of the entries in the second field may be reserved to signal that the PCID is the same, and each of the entries in the second subset may signal a PRB location (or position) and/or a bandwidth value.

In one aspect, an additional indication may be included in MIB to determine that the deployment is in unlicensed spectrum.

According to certain aspects, it may be desirable to deploy machine type communications (e.g., enhanced or evolved MTC (eMTC)) and narrowband communications (e.g., NB-IoT) in the same cell. However, such a deployment may not be possible with current agreements for the transmission of broadcast signalling (e.g., SIB1bis transmissions).

For example, SIB1 may be hopped per the following agreements. Frequency hopping for SIB1bis may be used at least for system bandwidths greater than or equal to 5 MHz. SIB1s frequency hopping may take place between two or four narrowbands depending on the system bandwidth. For example, there may be two narrowbands for a system bandwidth of 12-50 RBs, and there may be four narrowbands for a system bandwidth of 51-110 RBs. The narrowbands may be determined based on cell ID and system bandwidth. The hopping sequence between these narrowbands may be determined based on cell ID and subframe index (and/or system frame number (SFN)).

The frequency hopping for SIB1bis may be given by:

$$S=\{s_0, s_1, s_2, \ldots, s_{k-1}\}, \quad (2)$$

where S is a set of valid DL narrowbands s, and k is equal to the number of valid narrowbands for SIB1bis. For system bandwidths less than 12 RBs, SIB1bis may be transmitted in narrowband $s_j$ where j is equal to physical cell identifier (PCID) mod k. For system bandwidths between 12-50 RBs, the first narrowband may be $s_j$ where j=PCID mod k, the second narrowband may be $(s_j+\text{floor}(k/2))$ mod k, and the SIB1bis transmission may cycle through $\{1^{st}\text{ NB}, 2^{nd}\text{ NB}\}$ starting at SFN mod 8=0. For system bandwidths between 51-110 RBs, the first narrowband may be $s_j$ where j=PCID mod k, the second narrowband may be $(s_j+\text{floor}(k/4))$ mod k, the third narrowband may be $(s_j+2*\text{floor}(k/4))$ mod k, the fourth narrowband may be $(s_j+3*\text{floor}(k/4))$ mod k, and the SIB1bis transmission may cycle through $\{1^{st}\text{ NB}, 2^{nd}\text{ NB}, 3^{rd}\text{ NB}, 4^{th}\text{ NB}\}$ starting at SFN mod 8=0. Additionally, SIB1bis transmissions may be scheduled in MIB with five spare bits. The TBS and repetition of the SIB1bis transmission may be determined from the table illustrated in FIG. 11.

Aspects presented herein provide techniques that allow for deploying, for example, eMTC and NB-IoT, in the same cell.

According to aspects, the eNodeB may determine the particular implementation of deployment of eMTC operations and narrowband communications within a cell. In these cases, there may be no change to eMTC operation. In one case, for example, the eNodeB may signal the subframes containing SIB1bis as NB-IoT invalid subframes. This signalling can be RB-specific. Put differently, different RBs may have different subframe availability, and the RBs and subframes with SIB1bis transmission may be signalled as invalid.

Additionally or alternatively, in another case, the eNodeB may use brute force puncturing to allow for deployment of eMTC operations and narrowband communications in the same cell. For example, the eNodeB may puncture SIB1bis by transmission of NB-IoT RBs. In some cases, the eNodeB may use the least amount of resources possible to avoid degradation to eMTC UE reading SIB1bis.

According to certain aspects, deployment of eMTC and narrowband communications in the same cell may be possible by re-defining the narrowbands for SIB1bis. For example, the set S (shown in equation 2) of SIB1bis narrowbands s already excludes the center six RBs. Thus, in one aspect, re-defining the narrowbands for SIB1bis may include removing at least one subset ($s_i$) of the set S that may contain NB-IoT anchor RB, where i is from 0 to k−1. For example, if $s_0$ (where i=0) contains a NB-IoT RB, then $s_0$ may be removed from the set S (shown in equation 2). In some cases, the removal of a subset $s_i$ may be PCID specific (e.g., different PCID may have different sets).

In one aspect, re-defining the narrowbands for SIB1bis may include removing subsets $s_1$ for a subset of the SIB1bis combinations. For example, new entries may be introduced into a SIB1bis table (such as the table illustrated in FIG. 12), and the subsets si that may be removed from the set S may be done in accordance with the entries in the table.

Additionally or alternatively, according to certain aspects, deployment of eMTC and narrowband communications in the same cell may be possible by adjusting NB-IoT physical resource blocks based on SIB1bis. As mentioned above, there may be some cases in which the NB-IoT RB (anchor channel location) depends on the cell ID. For example, as mentioned above, the anchor RB location may be determined using equation 1. In another example mentioned above, there may be more than one anchor RB defined, and the UE may down-select from the anchor RB locations based on the cell ID.

In these cases, according to certain aspects, the down-selection may be based on PCID as follows: the RBs that are used for SIB1bis eMTC (based on PCID) may be discarded; and the remaining RBs may be further down-selected if needed, e.g., using the techniques described.

According to certain aspects, deployment of eMTC and narrowband communications in the same cell may be possible using a combination of the table illustrated in FIG. 12 and adjusting the NB-IoT RBs based on SIB1bis. For example, if there are entries in the new SIB1bis table (e.g., in FIG. 12) that do not remove NB-IoT, the narrowband RBs (for these entries) may be adjusted based on SIB1bis.

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software component(s) and/or module(s), including, but not limited to a circuit, an application specific integrated circuit (ASIC), a processor, or a processing system. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more components and/or modules may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise. Generally, where there are operations illustrated in Figures, those operations may be performed by any suitable corresponding counterpart means-plus-function components.

For example, means receiving, means for monitoring, and/or means for communicating may include a receiver, such as receive processor 238, MIMO detector 236, demodulator(s) 232a-232t, and/or antenna(s) 234a-234t of the base station 110 illustrated in FIG. 2 and/or MIMO detector 256, receive processor 258, demodulator(s) 254a-254r, and/or antenna(s) 252a-252r of the user equipment 120 illustrated in FIG. 2. Means for determining, means for generating, means for monitoring, means for decoding, means for indicating, means for transmitting, means for communicating, means for signaling, means for selecting, and/or means for performing, may include one or more processors (or a processing system), such as controller/processor 240, scheduler 246, transmitter processor 220, receive processor 238, MIMO detector 236, TX MIMO processor 230, and/or modulator(s)/demodulator(s) 232a-232t of the base station 110 illustrated in FIG. 2, and/or controller/processor 280, receive processor 258, transmit processor 264, MIMO detector 256, TX MIMO processor 266, and/or modulator(s)/demodulator(s) 254a-254r of the user equipment 120 illustrated in FIG. 2. Means for signaling, means for transmitting, means for communicating and/or means for indicating may include a transmitter, such as transmit processor 220, TX MIMO processor 230, modulator(s) 232a-232t, and/or antenna(s) 234a-234t of the base station 110 illustrated in FIG. 2, and/or transmit processor 264, TX MIMO processor 266, modulator(s) 254a-254r, and/or antenna(s) 252a-252r of the user equipment 120 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be, for example, any conventional processor, controller, microcontroller, FPGA, PLD, DSP, state machine, etc. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination thereof. A software module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC ("ABC" indicating A and B and C), as well as any combination with multiples of the same element (e.g., AA, AAA, ABB, AAC, ABBCC or any other ordering of A, B, C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a base station (BS), comprising:
    determining, based on one or more conditions, an exact frequency location of one channel of one or more channels to perform narrowband communications with a user equipment (UE), wherein the one channel corresponds to an anchor physical resource block for the narrowband communications;
    transmitting an indication of the one or more conditions to the UE in a master information block (MIB), wherein:
        the one or more conditions comprise a type of deployment for the narrowband communications and an indication of whether a cell identifier (ID) of a first cell associated with the BS is the same as a cell ID of a second cell; and
        the MIB comprises a field that jointly indicates the type of deployment and whether the cell ID of the first cell is the same as the cell ID of the second cell; and
    communicating with the UE, based at least in part on the exact frequency location of the one channel.

2. The method of claim 1, wherein:
    the one or more conditions further comprise whether the exact frequency location coincides with a narrowband available for transmitting a system information block (SIB) for enhanced machine type communication (eMTC); and
    a set of narrowbands available for transmitting the SIB for eMTC is reduced by one or more narrowbands available as an anchor channel location for a given operating bandwidth.

3. The method of claim 1, wherein:
    the one or more conditions further comprise an operating bandwidth of the UE; and
    determining the exact frequency location comprises selecting an anchor channel location for the operating bandwidth.

4. The method of claim 1, wherein a number of the one or more channels is based on a cell ID.

5. The method of claim 1, further comprising signaling an indication of the exact frequency location to the UE.

6. The method of claim 5, wherein the indication of the exact frequency location comprises a frequency offset with respect to a frequency grid.

7. The method of claim 5, wherein the indication of the exact frequency location is provided in at least one of a MIB, a primary synchronization signal (PSS), a secondary synchronization signal (SSS), or a physical downlink broadcast channel (PBCH).

8. The method of claim 1, wherein the type of deployment is an in-band deployment.

9. The method of claim 1, wherein the one or more conditions further comprises a number of antenna ports used for cell-specific reference signals (CRSs).

10. The method of claim 1, wherein the one or more conditions further comprise an operating bandwidth or a frequency offset with respect to a frequency grid.

11. The method of claim 1, wherein:
    frequency locations of the one or more channels correspond to raster frequency locations; and
    the raster frequency locations are non-uniformly distributed.

12. An apparatus for wireless communications, comprising:
    at least one processor; and
    memory coupled to the at least one processor, the memory including instructions executable by the at least one processor to cause the apparatus to:
        determine, based on one or more conditions, an exact frequency location of one channel of one or more channels to perform narrowband communications with a user equipment (UE), wherein the one channel corresponds to an anchor physical resource block for the narrowband communications;
        transmit an indication of the one or more conditions to the UE in a master information block (MIB), wherein:
            the one or more conditions comprise a type of deployment for the narrowband communications and an indication of whether a cell identifier (ID) of a first cell associated with the apparatus is the same as a cell ID of a second cell; and
            the MIB comprises a field that jointly indicates the type of deployment and whether the cell ID of the first cell is the same as the cell ID of the second cell; and
        communicate with the UE, based at least in part on the exact frequency location of the one channel.

13. An apparatus for wireless communications, comprising:
    means for determining, based on one or more conditions, an exact frequency location of one channel of one or more channels to perform narrowband communications with a user equipment (UE), wherein the one channel corresponds to an anchor physical resource block for the narrowband communications;
    means for transmitting an indication of the one or more conditions to the UE in a master information block (MIB), wherein:
        the one or more conditions comprise a type of deployment for the narrowband communications and an indication of whether a cell identifier (ID) of a first cell associated with the apparatus is the same as a cell ID of a second cell; and
        the MIB comprises a field that jointly indicates the type of deployment and whether the cell ID of the first cell is the same as the cell ID of the second cell; and
    means for communicating with the UE, based at least in part on the exact frequency location of the one channel.

14. A non-transitory computer-readable medium for wireless communication by a base station (BS), the computer-readable medium having computer executable code stored thereon, comprising:
  code for determining, based on one or more conditions, an exact frequency location of one channel of one or more channels to perform narrowband communications with a user equipment (UE), wherein the one channel corresponds to an anchor physical resource block for the narrowband communications;
  code for transmitting an indication of the one or more conditions to the UE in a master information block (MIB), wherein:
    the one or more conditions comprise a type of deployment for the narrowband communications and an indication of whether a cell identifier (ID) of a first cell associated with the BS is the same as a cell ID of a second cell; and
    the MIB comprises a field that jointly indicates the type of deployment and whether the cell ID of the first cell is the same as the cell ID of the second cell; and
  code for communicating with the UE, based at least in part on the exact frequency location of the one channel.

* * * * *